United States Patent [19]
Hall

[11] Patent Number: 5,665,827
[45] Date of Patent: Sep. 9, 1997

[54] SYNTHESIS OF MULTIBLOCK POLYMERS USING GROUP IIA AND IIB METAL CYCLIC ORGANOMETALLIC INITIATORS

[75] Inventor: James E. Hall, Mogadore, Ohio

[73] Assignee: Bridgestone Corporation, Tokyo, Japan

[21] Appl. No.: 743,783

[22] Filed: Nov. 7, 1996

[51] Int. Cl.$^6$ .................. C08F 297/04; C08F 297/02
[52] U.S. Cl. .................. 525/280; 525/267; 525/272; 525/286; 525/289; 525/299; 525/314; 525/342; 525/359.5; 525/360; 525/370; 525/371; 525/374; 525/375; 525/379; 525/383; 525/386; 525/409; 525/474; 525/479; 526/183; 526/190
[58] Field of Search .................. 525/267, 272, 525/279, 280, 286, 289, 299, 314, 342, 359.5, 370, 375, 386, 409, 474, 479

[56] References Cited

U.S. PATENT DOCUMENTS

| | | |
|---|---|---|
| 3,351,646 | 11/1967 | Ramsden et al. . |
| 3,354,190 | 11/1967 | Ramsden et al. . |
| 3,388,179 | 6/1968 | Ramsden et al. . |
| 3,726,933 | 4/1973 | Smith et al. .................. 526/183 X |
| 3,739,042 | 6/1973 | Chu et al. .................. 525/280 |
| 3,766,091 | 10/1973 | Vanderberg .................. 528/413 X |
| 3,822,219 | 7/1974 | Kamienski et al. . |
| 4,116,887 | 9/1978 | Lehn et al. .................. 528/37 X |
| 4,139,490 | 2/1979 | Halasa et al. . |
| 4,242,232 | 12/1980 | Sylvester et al. . |
| 4,410,742 | 10/1983 | Mueller . |
| 4,429,091 | 1/1984 | Hall . |
| 4,461,883 | 7/1984 | Takeuchi et al. . |
| 4,696,984 | 9/1987 | Carbonaro et al. . |
| 5,066,729 | 11/1991 | Stayer et al. . |
| 5,264,527 | 11/1993 | Varshney et al. .................. 525/280 X |
| 5,521,309 | 5/1996 | Anthowiak et al. . |

FOREIGN PATENT DOCUMENTS 0316255  10/1988  European Pat. Off. .

OTHER PUBLICATIONS

H.L.Hsieh & I.W. Wang "Effects of Dibutymagnesium on Alkyllithium–Initiated Polymerizations", Macromolecules 1986, 19, 299–304.

Paul Rempp, Emile Franta, Jean–E. Herz, "Macromolecular Engineering by Anionic Methods", Advances in Polymer Science 86,148,149,159 & 160.

Marcel Van Beylen, et al., "Developments in Anionic Polymerization—A Critical Review", Advances in Polymer Science 86,117–119,141 & 142.

K. Fujita et al., "Magnesium–Butadiene Addition Compounds: Isolation, Structural Analysis & Chemical Reactivity", Journal of Organometallic Chemistry, 113 (1976), 201–213.

G. Hild et al., "Cyclic Macromolecules", Eur. Polym. J, vol. 19, No. 8, 721–727, 1983.

G. Hild et al., "Synthesis of Ring–shapes Macromolecules", Eur. Polym. Journal, vol. 16, 525–527.

Barton J. Schober et al., "New Delocalized Tetraanion Initiators For Polymeric Catenane Synthesis", 199–200.

D. Geiser & H. Hocker, "Synthesis and Investigation of Macrocyclic Polystyrene", Macromolecules 1980, 13, 653–656.

Hajime Yasuda et al., "Magnesium–Assisted Sterospcific Oligomerization of Isoprene . . . ", Macromolecules, vol. 11, No. 3, 1983, 586–592.

Jacques Rooves et al., "Synthesis of High Molecular Weight . . . " Macromolecules 1983, 16, 843–849.

Gert–Jan M. Gruter et al., "Formation of the First Organometallic Catenane", J.Am. Chem. Soc., 1993, 115, 12179–12180.

Friedrick Bickelhaupt, "Organomagnesium Chemistry: nearly hundred years but still fascinating", Journal of Organometallic Chemistry, 475 (1994), 1–14.

Primary Examiner—Fred Teskin

[57] ABSTRACT

The invention is a practical process for anionically synthesizing multiblock polymers containing a plurality of blocks formed from polar and/or non-polar monomers by using a cyclic organometallic compound initiator that comprises a divalent metal atom and an organic moiety contained in a ring, preferably a cycloorganomagnesium initiator. Activation of the ring metallic atom results in anionic polymerization of the monomers by addition into the initiator ring at the bonds between the metallic atom and its two adjacent carbon atoms, the metallic atom acting as a bridge between the two living ends of the propagating chain. The active chain ends can be coupled or terminated.

23 Claims, No Drawings

SYNTHESIS OF MULTIBLOCK POLYMERS USING GROUP IIA AND IIB METAL CYCLIC ORGANOMETALLIC INITIATORS

The subject invention relates to a method of synthesizing multiblock polymers form polar and/or non-polar monomers by using a cyclic organometallic compound initiator that comprises a divalent metal atom and an organic moiety contained in a ring, preferably a cycloorganomagnesium initiator. The multiblock polymers synthesized by the process of the present invention are thermoplastic elastomers that do not need to be cured and are used in injection molding processes to prepare articles such as shoe soles, small robber tires, toys and the like.

Previous methods to synthesize multiblock polymers, such as A-B-A triblock polymers have utilized mono and di-anions such as monolithio and dilithio compounds as initiators in anionic polymerization techniques. These initiators are not acceptable for polymerizing certain polar monomers.

Organomagnesium compounds, by themselves, are generally known to be ineffective catalysts for anionic polymerization of 1,3-dienes and vinyl aromatic monomers. However, dialkylmagnesium reagents, or other dialkylmetallic complexes of metals of Group IIa of the Periodic System, can participate in anionic polymerization when complexed with alkyl lithium compounds, or with alkylmetallic complexes of other metals of Group I of the Periodic System, to produce linear polymers or copolymers of predictable molecular weight. The production of triblock polymers utilizing such catalysts, however, has not been described.

Certain low molecular weight organomagnesium adducts, known to be useful in a similar manner as Grignard reagents, can be prepared by the reaction of activated magnesium metal or magnesium hydride with styrene, substituted styrenes, conjugated diolefins, such as butadiene, isoprene and myrcene, or certain aromatic hydrocarbons, such as anthracene and naphthalene, in the presence of a saturated cyclic ether, such as THF. In addition, magnesium-butadiene adducts in the ratios of 1:1, 1:2, 1:3 and 1:4 have been obtained by reacting metallic magnesium and butadiene in THF in the presence of a catalytic amount of an organic halide. However, polybutadiene could not be obtained in this system because magnesium-butadiene adducts of ratios greater than 1:5 resulted in inactivation of the living ends due to ring closure.

Magnesium-isoprene adducts have also been synthesized by reacting isoprene with magnesium metal activated with minute quantities of iodine, alkyl halides and/or metal halides in the presence of a solvent, such as THF. The adducts behaved as Grignard reagents and were reactive with air and moisture. Isolation of the unstable adducts was achieved by quenching with a protic agent, such as water or alcohol. The adducts were shown to be, before quenching, low molecular weight macrocyclic structures containing 1 to 5 magnesium atoms in the ring, and had catalytic activity in the oligomerization of isoprene to form non-cyclic, linear 3,4-polyisoprene. The formation of this linear oligomer, however, was dependent on the amount of isoprene in the mixture and was in competition with the formation of cyclic compounds which had no further activity because, as the magnesium-butadiene adducts described above, ring closure resulted in termination of the oligomerization reaction.

Until the present invention, therefore, there has not been described a method for anionic synthesis of multiblock polymers utilizing di-cations. Further, there has not been described a practical method for anionic polymerization of both polar and non-polar monomers to form a wide variety of multiblock polymer products.

SUMMARY OF INVENTION

The present invention provides a practical process for synthesizing commercially significant quantities of multiblock, preferably triblock polymers, containing polar and/or non-polar monomers, by utilizing a cyclic organometallic compound that comprises a divalent metal atom and in organic moiety contained in a ring, preferably a cycloorganomagnesium compound as an initiator for anionic polymerization. The polymers synthesized by the process of the invention may also be used as thermoplastic elastomeric compounds that do not need to be cured. Such elastomers are useful in rapid injection molding techniques to form articles, such as small tires and toys.

The cyclic organometallic compounds utilized in the process of the invention are prepared by known methods and comprise low molecular weight ring-shaped adducts of Group IIA or IIB metals in combination with butadiene, isoprene, anthracene, or the like, and contain one or more metal atoms in the ring structure. According to the invention, multiblock polymers, such as A-B-A triblock polymers are prepared from these initiators by incorporation of a suitable monomer into the initiator ring at two living "ends" that are bridged by each metal atom to form a center block "B" having two active ends. A second different monomer is then used to contemporaneously form terminal blocks "A" with one terminal block being located on each end of the "B" block. Additional blocks may then be added onto the polymer backbone at both active ends using additional monomer charges. In order for anionic polymerization of non-polar monomers to occur, the metal atom must be activated by known methods, preferably by complexing with a Group I metal alkyl or alkoxy compound, such as an organometallic compound comprising a metal selected from the group consisting of lithium, sodium, potassium, rubidium, cesium and mixtures of these. Polar solvents or modifiers may also be employed to promote activation of the Group IIA or IIB metal atom. In anionic polymerization of polar monomers, the polar monomers themselves serve as activators for the Group IIA or IIB metal atom. As monomers are continually incorporated into the blocks, the terminal carbons of the two living ends remain in close proximity to each other due to the bridging Group IIA or IIB metal atom which is carried at each propagating living end of the growing polymer ring.

When polymerization is complete, the active ends may be terminated by conventional methods such as quenching or a coupling agent may optionally be added to the mixture to terminate the reaction and couple together the living ends of the same block polymer to form a macrocyclic block polymer and/or two different linear A-B-A block polymer chains may be coupled.

DETAILED DESCRIPTION OF THE INVENTION

The subject invention provides a novel process for synthesizing multiblock polymers, such as triblock polymers, by employing Group IIA or IIB metal cyclic organometallic compounds as initiators of anionic polymerization of two sequential charges of polar monomers or non-polar monomers.

The cyclic organometallic initiators for use in the invention are prepared according to known methods, under anhydrous, anaerobic conditions, by reacting "m" divalent metal, Mt, in the form of elemental metal or a reactive compound, such as a hydride, with "n" reactants (Rct), where m and n each independently represent at least one, according to the formula:

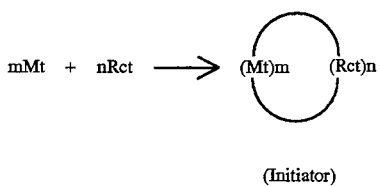

(Initiator)

The metal can be in the form of elemental metal, either pure or alloyed with another, nonreactive metal, or in the form of a reactive compound, such as a metal hydride. Typically, pure metal is used. As is known with the formation of Grignard reagents, the metal may be activated by scraping, ultrasound or the addition of small amounts of activators, such as alkyl halides, metal alkyl halides or halogens, such as iodine. Suitable Group IIA or IIB metals useful in producing the cyclic organometallic initiators for use in the present invention include beryllium, calcium, barium, strontium, magnesium, cadmium, zinc and mercury.

The reactant, Rct, can be olefinic, such as alkene or alkadiene (e.g., a $C_2$–$C_2$ alkene or $C_4$–$C_{40}$ alkadiene), or alkylene, such as styrene or styrene analogs (e.g., a $C_8$–$C_{28}$ aralkene), polynuclear aromatic, or a dihaloorganic compound, such as the alpha, omega dihalo $C_4$–$C_8$ alkane or a di(halomethyl) substitute aromatic, such as 1,2-di(chloromethyl)benzene or 1,8-di(bromomethyl)naphthalene.

The initiator ring incorporates at least one metal atom and at least one Rct unit and generally contains at least 3, and usually a total of 5 to 50, ring member atom. Typically, the larger number of ring atoms (e.g. greater than 12) result when there is more than one metal atom and more than one Rct unit in the ring (i.e., n and m>1). When n=m=1, the initiator ring usually has 5 to 8 ring atoms and typically 5 to 7 ring atoms.

The cyclic organometallic initiator thus synthesized is employed to initiate polymerization, under anhydrous, anaerobic conditions, of two subsequent charges with each charge containing at least one anionically polymerizable, polar or non-polar monomer, to form a triblock polymer.

The preferred Group IIA or IIB metal cyclic organometallic compounds used as initiators in the invention are cyclic low molecular weight adducts containing Group IIA or IIB metal, preferably magnesium, preferably obtained by reacting activated magnesium metal or magnesium hydride or other reactive Group IIA or IIB metal, in the presence of a solvent, such as benzene or tetrahydrofuran (THF), with hydrocarbons, such as $C_2$–$C_{12}$ alkylenes, styrene, $C_1$–$C_7$ alkyl or alkoxyl or aryloxyl substituted styrenes, cyclic or acyclic conjugated $C_4$–$C_{40}$ diolefins, including butadiene, isoprene, myrcene, α-phellandrene, and the like, or aromatic hydrocarbons, such as anthracene and naphthalene, and mixtures of the foregoing. Suitable hydrocarbon compounds for use in preparing the magnesium-containing adducts are disclosed in U.S. Pat. Nos. 3,388,179, 3,354,190 and 3,351,646, the portions of which pertaining to such hydrocarbon compounds are hereby incorporated by reference. Other suitable synthesis methods may also be employed to prepare cycloorganomagnesium initiators. For example, certain dihalo organic compounds will react with magnesium and, via the Schlenk equilibrium, produce magnesium dihalide and a cycloorganomagnesium product suitable for use as an initiator of the invention.

The resulting adducts may contain one or more magnesium atoms, preferably up to five magnesium atoms, and from one to about 25 monomer units per magnesium atom in the ring structure. Some known ring structures containing, on average, 25 monomer units have been reported to contain five magnesium atoms; rings containing 27 units, three magnesium atoms; and larger ring structures, one magnesium atom. A typical initiator suitable for use in the process of the invention is a magnesium-isoprene adduct, illustrated below, containing six isoprene monomers and three magnesium atoms in the ring. However, larger or smaller cycloorganomagnesium compounds, containing more or fewer magnesium atoms are also suitable as initiators.

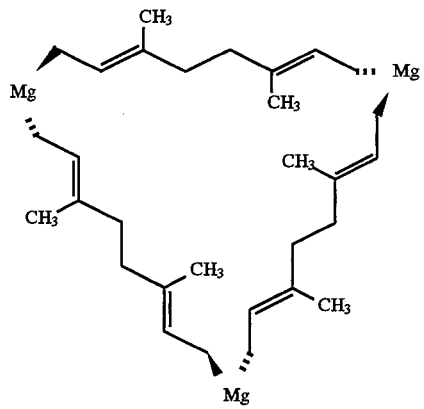

According to the process of the invention, a multiblock polymer, such as a triblock polymer is prepared by sequentially reacting (1) at least one anionically polymerizable monomer, which may be a polar or a non-polar monomer, with a Group IIA or IIB metal cyclic organometallic initiator, in the presence of an anhydrous solvent to form a central "B" block with (2) at least one different anionically polymerizable monomer, which may be a polar or a non-polar monomer, to form the terminal "A" blocks. Larger multiblock polymers may be formed by the further reaction of other anionically polymerizable monomers having a different composition than the previously formed block. As described further below, activation of a Group IIA or IIB metal atom in the initiator ring results in anionic polymerization of the monomers by addition into the initiator ring at the bonds between the Group IIA or IIB metal atom and its two adjacent carbon atoms. Thus, the Group IIA or IIB metal atom acts as a bridge between the two "living ends" of the growing cyclic polymer ring and, as monomers are continually incorporated into the ring, the terminal carbons of the two living ends remain in close proximity to each other.

When polymerization is complete, the polymerization may be terminated by quenching with isopropanol or other known quenching agents or with a coupling agent. Coupling agents are used to couple together the living ends of the polymer ring, thus producing stable macrocyclic block polymers.

Depending on the method of termination, the polymers produced by the process of the invention are linear triblock polymers, pentablock polymers and the like and macrocyclic coupled diblock polymers, tetrablock polymers and the like or mixtures thereof of varying sizes. The sizing and properties of the multiblock polymers including triblock polymers A-B-A formed by the process of the invention also vary according to the nature and concentration of the monomers, the ratio of monomer to Group IIA or IIB metal initiator, the polymerization time, as well as the nature and reactivity of the termination agent (X), which may be a coupling agent and/or an end capping agent, as described further below. Thus, single ring diblock polymers of varying sizes may be produced by intramolecular coupling of the living ends. In addition, the presence of more than one magnesium atom in the ring and, therefore, the presence of more than one site for propagation of the polymer chain, may result in single ring sizes that are, for example, double-sized or triple-sized having two or three triblock segments respectively. In addition, the coupling agent may couple together living ends of more than one ring, resulting in intermolecular coupling containing multiple block polymer segments. Moreover, by a similar process, intertwining polymer chains or catenanes may be formed. A tetrafunctional coupling agent may produce a figure eight double ring.

If non-polar monomers are to be polymerized by the process of the invention, the reaction preferably further required the presence of a Group I organometallic compound which forms a complex with the Group IIA or IIB metal atom on the ring to activate the Group IIA or IIB metal atom and allow polymerization to occur. Preferably, the Group I compound is one that does not promote linear polymerization. For example, a lithium alkoxide compound which does not promote linear polymerization is preferred over an alkyllithium compound known to promote linear polymerization. The reaction between organometallic compounds of Group I and Group IIa of the Periodic System are disclosed in U.S. Pat. No. 3,822,219, the portions of which pertaining to Group I compounds reactive with Group IIA or IIB metals such as magnesium are hereby incorporated by reference.

If polar monomers are to be polymerized by the process of the invention, a Group I activator is generally not needed for polymerization.

Monomers which may be polymerized to form A-B-A triblock polymers or polymer segments in ring structures in the process of the invention include, polar monomers including but not limited to alkyl methacrylates having from about 5 to about 25 carbon atoms, $C_2$–$C_8$ alkylene oxides such as ethylene oxide and propylene oxide, acrylonitriles, lactams, alkyl acrylates having from about 4 to about 25 carbon atoms, cyclosiloxanes, vinyl pyridine, and mixtures and copolymers thereof; and non-polar monomers including, but not limited to hydrocarbons such as ethylene; conjugated alkadienes having from about 4 to about 40 carbon atoms, preferably $C_4$–$C_{12}$ alkadienes including butadiene, isoprene and the like; aryl alkene monomers having from about 8 to about 20 carbon atoms, such as styrene and $C_1$–$C_7$ alkyl and alkoxy substituted styrenes; vinyl polynuclear aromatics, such as vinyl anthracene and vinyl naphthalene and their $C_1$–$C_7$ alkyl and alkoxy substituted analogs; $C_6$–$C_{18}$ trienes; and mixtures thereof.

Thus, each block "A" or "B" of the multiblock polymers may comprise, but is not limited to polyethylene, polyethylene oxide, polyvinylpyridine, polyacrylate, polymethylacrylate, polymethylmethacrylate, polyacrylonitrile, polylactam, and mixtures and copolymers thereof. Further, each block of the polymer may comprise, but is not limited to, polybutadiene, polyisoprene, polystyrene, poly-α-methyl styrene, polyvinylanthracene, polyvinylnaphthalene, and mixtures and copolymers thereof, such as styrene/butadiene rubber.

Polymerization is usually conducted in a conventional solvent for anionic polymerization, such as hexane, cyclohexane, benzene, tetrahydrofuran and the like. Various techniques for polymerization, such as batch, semi-batch and continuous polymerization may be employed. In order to increase vinyl content, in the case of diene monomers, a polar coordinator may optionally be added to the polymerization ingredients. Amounts of the polar coordinator range between about 0.1 to about 90 or more equivalents per equivalent of Group IIA or IIB metal atom. The amount depends upon the type of polar coordinator that is employed, the amount of vinyl content desired and the temperature of the polymerization reaction, as well as the selected initiator. Compounds useful as polar coordinators are organic and include, but are not limited to, tetrahydrofuran, linear and cyclic oligomeric oxolanyl alkanes such as 2-2'-di (tertrahydrofuryl) propane, di-piperidyl ethane, dimethyl ether, diazabicyclooctane, hexamethylphosphoramide, N-N'-dimethylpiperazine, diethyl ether, tributylamine and the like. The linear and cyclic oligomeric oxolanyl alkane polar coordinators are described in U.S. Pat. No. 4,429,091, the subject matter of which regarding polar solvents is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary diamines, such as tetramethylethylene diamine (TMEDA).

According to the process of the invention, polymerization is begun by sequentially or concurrently charging a blend of the monomer(s) and solvent to a suitable reaction vessel, followed by the addition of Group I organometallic compound, if necessary, and the Group IIA or IIB metal atom containing cyclic organometallic compound, preferably a cycloorganomagnesium initiator. As with the preparation of the initiator, the polymerization reaction is carried out under anhydrous, anaerobic conditions. Often, it is conducted under a dry, inert gas atmosphere. The polymerization can be carried out at any convenient temperature, such as about −30° C. to about 200° C. For batch polymerizations, it is preferred to maintain the peak temperature at from about 49° C. to about 149° C., and more preferably from about 80° C to about 120° C. Polymerization is allowed to continue under agitation for about 0.015 to 24 hours.

After polymerization is complete, the product is terminated by a coupling agent or an end capping agent to obtain a linear polymer having three or more block segments or cyclic polymer having two or more block segments or a blend thereof. A termination agent is added to the reaction vessel, and the vessel is agitated for about 0.1 to about 4.0 hours. An antioxidant, such as butylated hydroxy toluene (BHT) may be added to prevent degradation of the polymer.

Lastly, the solvent is removed from the polymer by conventional techniques such as drum drying, extruder, drying, air drying or the like, which may be combined with steam desolventation or coagulation with alcohol. If steam desolventation is used, oven drying may be desirable.

The number average molecular weight of the block polymers prepared according to the process of the present invention ranges from about 2,000 to about 1,000,000.

As discussed above, termination of the polymerization reaction, such as an A-B-A block polymer with a coupling agent serves to couple the living ends of the polymer chains together to form intramolecular or intermolecular polymer rings that contain one or more A-B-A block segments and/or to attach two different linear A-B-A block segments. After quenching with a non-coupling terminating agent such as isopropanol, the polymers retain the endcap group on the block polymer thereby encapping the linear polymers present in the multiblock polymer as described below.

Examples of suitable terminating agents, such as encapping agents are alkanols such as isopropanol and coupling agents, such as substituted aldimines, substituted ketimines, 4,4'-bis (dimethylamino)-benzophenone, 1,3-dimethyl-2-imidazolidinone, 1-alkyl substituted pyrrolidinones, 1-aryl substituted pyrrolidinones, butyl benzoate, tin tetrachloride, dibutyl tin chloride, dibutyl tin dichloride, carbon dioxide, and mixtures of these. Further examples of reactive compounds include the terminators described in U.S. Pat. No. 5,066,729 and in our copending application Ser. No. 08/363, 111, the subject matter of which, pertaining to terminating agents and terminating reactions, is hereby incorporated by reference. The practice of the present invention is not limited solely to these terminators, since other compounds that are reactive with the polymer bound carbon-magnesium moiety can be selected to provide a desired terminal group or coupling group.

Typical of preferred coupling agents are orthodichloroxylene (ODX), dimethylamino benzaldehyde (DMAB), dimethyl silicon dichloride, and mixtures of these.

As stated above, it has been found that linear multiblock polymers and macrocyclic polymers containing multiple block segments can be produced by the process of the present invention from both polar and non-polar monomers that are anionically polymerizable. The linear polymers and the macrocyclic polymers according to the invention exhibit desirable properties, such as lower viscosities at equivalent molecular weights. Thus, higher molecular weight macrocyclic polymers may be used during polymer compounding processes and still obtain manageable compound viscosities, resulting in enhanced polymer processability during mixing, molding and extruding. Such elastomers, are used to form articles, such as small tires, extrusion molded toys and the like.

EXAMPLES AND GENERAL EXPERIMENTAL PROCEDURE

In order to demonstrate the preparation and properties of multiblock polymers, such as triblock polymers prepared according to the present invention, two cycloorganomagnesium initiators were prepared by known methods, as described above. The initiators were then used to polymerize sequential charges of a solution of butadiene and then styrene monomers.

The described initiators are intended to be only examples of initiators that may be used in the process of the invention, and their particular use is not intended to be limiting, as any cycloorganomagnesium compound that can be prepared may be utilized by those skilled in the art.

CYCLOORGANOMAGNESIUM INITIATOR PREPARATION

The following isoprene-magnesium and styrene-butadiene-magnesium initiators were prepared in 28-ounce and 10-ounce beverage bottles, respectively. The bottles were baked for at least 24 hours at 115° C. and then capped with crown, two-hole caps and rubber liners. The bottles were cooled while purging with nitrogen.

1. Isoprene-Magnesium Initiator (IMG)

In order to prepare the IMG initiator, 10 grams of 50-mesh magnesium metal shavings were activated by 2 millimoles (mM) of butyl magnesium chloride in tetrahydrofuran (THF), in the presence of 115 grams of isoprene and a further 231 grams of anhydrous THF. The reaction mixture was heated to 80° C. in a rotating water bath. Oligomerization of the isoprene was allowed to occur for 18 hours at which time all of the magnesium was reacted. The initiator had a greenish color in THF.

The total magnesium concentration was determined by acid titration of hydrolyzed initiator. IMG active towards polymerization was determined by polymerizing 1,3-butadiene in hexane at three concentrations of added IMG in the presence of lithium-t-butoxide. Linear least squares analysis of molecular weight data and correction for impurities yielded the concentration of active IMG. This IMG was subsequently used as an initiator for polymerization in Example 1.

2. Styrene-Butadiene-Magnesium Initiator (SBMG)

To each of two 10-ounce crown-capped beverage bottles was charged 1 gram of 50-mesh magnesium shavings (41 mM), followed by 30 ml. of THF and 10 ml. styrene (86.5 mM in THF). To one of the bottles (#1), 38.4 grams of 23.6% 1,3-butadiene in hexane (167 mM) were charged. To the other bottle (#2), 43.5 grams of 23.6% 1,3-butadiene in hexane (140 mM) were charged. Bottle #1 was placed in an ultrasound bath to activate the magnesium metal. Bottle #2 was placed in a 65° C. water bath. After three days, most, but not all, of the magnesium in bottle #1 had reacted. The reaction in bottle #2 took longer and some magnesium was still present after seven days.

From bottle #1, the THF was removed by evaporation. The SBMG in bottle #1 was dissolved by adding 80 ml. of styrene and 20 ml. of hexane. Titration of the SBMG in bottle #1 showed a magnesium concentration of 0.40 molar. This SBMG was subsequently used as an initiator for polymerization in Example 2.

POLYMER PREPARATION

The following examples illustrate the process of the invention for the preparation of triblock polymers from cycloorganomagnesium initiators. However, the examples are not intended to be limiting, as other methods for preparing these triblock polymers from cycloorganomagnesium initiators may be determined by those skilled in the art.

Each of the following polymers was prepared in a purged, oxygen-free one gallon stainless steel reactor. The monomers and solvents had been dried to approximately 5 parts per million (ppm) of water.

EXAMPLE 1

A styrene-butadiene-styrene triblock polymer was prepared using the cycloorganomagnesium initiator, IMG, as follows: To the reactor was charged 175 grams of 1,3-butadiene in 1800 grams technical hexane, followed by 4.8 mM IMG in hexane and 7.2 mM of lithium-t-butoxide in cyclohexane. The reactor was then heated to 75° C. and the reaction allowed to proceed for 4 hours. Then 226 grams of 33% styrene in hexane were added and polymerization proceeded at 90° C. for an additional hour. The reaction was then terminated by dropping the resulting polymer cement into an equal volume of isopropanol. The polymer was then isolated by precipitation after the addition of the drum-dried.

The recovered S-B-S triblock polymer was pressed at 175° C. into a flat 0.40 inch sheet, microdumbbels were cut from each sample, and the tensile strength of each was measured by standard methods. It was found that the triblock polymer exhibited a tensile strength at break and $T_b$=1549 psi@$E_b$=1432%, where $T_b$ equals tensile strength at break and $E_b$ equals elongation at break.

EXAMPLE 2

A styrene-butadiene-styrene block polymer was prepared using the cycloorganomagnesium initiator, SBMG, as follows: To the reactor was charged 1.25 lbs. of 24.8% 1,3-butadiene in technical hexane and 3.1 lbs. of additional hexane, followed by 3.8 mM SBMG in styrene/hexane and 5.7 mM of lithium-t-butoxide in cyclohexane. The reactor was then heated to 60° C. and the reaction allowed to proceed for 4 hours. Then 180 grams of 33% styrene in hexane were added and polymerization proceeded for an additional hour. The coupling agent, 3.0 mM dibutyl-tin-dichloride was then added to the reactor. After one hour, the reaction was then terminated by dropping the resulting polymer cement into an equal volume of isopropanol.

The polymer was then separated into two parts. One part was additionally treated with a slight excess of reagent grade (35%) hydrochloric acid. The two parts of the polymer were then isolated by precipitation after the addition of BHT and drum-dried.

The polymer produced from the cycloorganomagnesium initiator by the method of this example, before addition of the coupling agent, is a styrene-butadiene-styrene (S-B-S) triblock polymer. Treatment of this polymer with a coupling agent, such as dibutyl-tin-dichloride would result in a cyclic polymer which, in effect, has a styrene-butadiene (S-B) structure, wherein the isolated macrocycles each have a single polystyrene segment.

Treatment of the macrocyclic polymer with hydrochloric acid would result in the breaking of the carbon-tin bonds in the middle of the polystyrene block. The styrene polymer ends would thus be freed to move into separate domains and to form the classic S-B-S triblock domain structure.

To determine if such a macrocyclic S-B-S triblock polymer was prepared by the method of this example, the peak molecular weights of both the HCL-treated and untreated polymer were determined by GPC analysis. In theory, the peak molecular weight of the HCL-treated polymer should be greater than that of the untreated polymer. The results supported the theory. The HCL-treated polymer had a peak molecular weight of 124,100 and the untreated polymer had a peak molecular weight of 110,800.

In theory, the tensile strength of the HCL-treated (triblock S-B-S) polymer should be greater than that of the untreated, coupled (S-B) polymer. To test this theory, each polymer was pressed at 200° C. into a flat 0.40 inch sheet, micro-dumbbels were cut from each sample, and the tensile strength of each was measured by standard methods. It was found that the untreated polymer was very weak and exhibited a tensile strength of $T_b$=30 psi@$E_b$=25%, where $T_b$ equals tensile strength at break and $E_b$, equals elongation at break. The HCL-treated polymer had a tensile strength of $T_b$=330 psi@$E_b$=374%, or more than ten times the tensile strength of the untreated polymer. Thus, the results of both the molecular weight and tensile strength testing of the HCL-treated and untreated polymers provide evidence that the method of Example 2 produced a macrocyclic S-B block polymer.

In conclusion, it is clear from the foregoing examples and specification disclosure that the process of the present invention is capable of producing block polymers by utilizing cycloorganomagnesium compounds as initiators of anionic polymerization of polar and/or non-polar monomers.

The invention is not limited to the specific reactants, cycloorganomagnesium initiators and Group I organometallic compounds disclosed, nor to any particular polar or non-polar monomers, modifiers or solvents. Similarly, the examples have been provided merely to demonstrate the practice of the subject invention and do not constitute limitations of the invention. Those skilled in the art may readily select other monomers and process conditions, according to the disclosure made herein above. Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. A process for preparing a triblock polymer comprising the steps of (1) reacting a first monomer charge of at least one anionically polymerizable monomer with an initiator comprising a cyclic organometallic compound that comprises a divalent metal atom and an organic moiety contained in a ring, to form a first block having two terminal active ends (2) forming a triblock polymer by reacting a second monomer charge of at least one anionically polymerizable monomer with the first block to form a second block on each of the terminal active ends of the first block, said second monomer charge being dissimilar in composition to the first monomer charge.

2. The process of claim 1, wherein the divalent metal atom is selected from the group consisting of beryllium, calcium, barium, strontium, magnesium, cadmium, zinc and mercury.

3. The process of claim 1, wherein the anionically polymerizable monomer of the first monomer charge is a polar monomer.

4. The process of claim 1, wherein the anionically polymerizable monomer of the first monomer charge is a non-polar monomer.

5. The process of claim 1, wherein the anionically polymerizable monomer of the second monomer charge is a polar monomer.

6. The process of claim 1, wherein the anionically polymerizable monomer of the second monomer charge is a non-polar monomer.

7. The process of claim 3, wherein the polar monomer is selected from the group consisting of alkyl methacrylates having from about 5 to about 25 carbon atoms, $C_2$–$C_8$ alkylene oxides, acrylonitriles, lactams, alkyl acrylates having from about 4 to about 25 carbon atoms, cyclosiloxanes, vinyl pyridine, ad mixtures and copolymers thereof.

8. The process of claim 5, wherein the polar monomer is selected from the group consisting of alkyl methacrylates having from about 5 to about 25 carbon atoms, $C_2$–$C_8$ alkylene oxides, acrylonitriles, lactams, alkyl acrylates having from about 4 to about 25 carbon atoms, cyclosiloxanes, vinyl pyridine, and mixtures and copolymers thereof.

9. The process of claim 4, wherein the non-polar monomer is selected from the group consisting of ethylene; conjugated alkadienes having from about 4 to about 40 carbon atoms; aryl alkenes having from about 8 to about 20 carbon atoms; vinyl polynuclear aromatics; $C_6$–$C_{18}$ trienes; and mixtures thereof.

10. The process of claim 6, wherein the non-polar monomer is selected from the group consisting of ethylene; conjugated alkadienes having from about 4 to about 40 carbon atoms; aryl alkenes having from about 8 to about 20 carbon atoms; vinyl polynuclear aromatics; $C_6$–$C_{18}$ trienes; and mixtures thereof.

11. The process of claim 1, wherein the reaction is carried out in the presence of an organometallic compound comprising a metal selected from the group consisting of lithium, sodium, potassium, rubidium, cesium and mixtures thereof.

12. The process of claim 1, wherein the reaction is carried out in the presence of a non-protic solvent.

13. The process of claim 1, wherein the reaction is terminated with an endcapping agent.

14. The process of claim 1, wherein the reaction is terminated with a coupling agent.

15. The process of claim 14, wherein the coupling agent is selected from the group consisting of substituted aldimines, substituted ketimines, 4,4'-bis(dimethylamino)-benzophenone, 1,3-dimethyl-2-imidazolidinone, 1-alkyl substituted pyrrolidinones, 1-aryl substituted pyrrolidinones, tin tertrachloride, dibutyl tin chloride, carbon dioxide, ortho-dichloro-xylene, esters, dihalo hydrocarbons, dimethylamino benzaldehyde, dimethyl silicon chloride, butyl benzoate, and mixtures of these.

16. The process of claim 1, wherein the first monomer charge comprises 1,3-butadiene.

17. The process of claim 1, wherein the second monomer change comprises styrene.

18. The process of claim 1, wherein the cyclic organometallic compound is a cycloorganomagnesium oligomer comprising at least one magnesium atom and a non-polar monomer.

19. The process of claim 18, wherein the non-polar monomer selected from the group consisting of ethylene, $C_4$–$C_{12}$ conjugated alkadienes, $C_8$–$C_{20}$ aryl alkenes and mixtures thereof.

20. The process of claim 18, wherein the non-polar monomer is selected from the group consisting of ethylene, styrene, $C_1$–$C_7$ alkyl or alkoxyl or aryloxyl substituted styrenes, isoprene, butadiene, vinyl anthracene, vinyl naphthalene and mixtures thereof.

21. The process of claim 18, wherein the oligomer comprises between about 1 and about 25 monomer units.

22. The process of claim 18, wherein the oligomer comprises between about 1 and about 5 magnesium units.

23. The process of claim 1, wherein the organic moiety is formed from a compound selected from the group consisting of $C_2$–$C_{12}$ alkylenes, styrene, $C_1$–$C_7$ alkyl or alkoxyl or aryloxyl substituted styrenes, conjugated $C_4$–$C_{40}$ diolefins, aromatic hydrocarbons and mixtures thereof.

* * * * *